F. G. & W. F. NIEDRINGHAUS.
Handle for Tea and Coffee Pots of Enamelled Iron Ware.
No. 209,132. Patented Oct. 22, 1878.
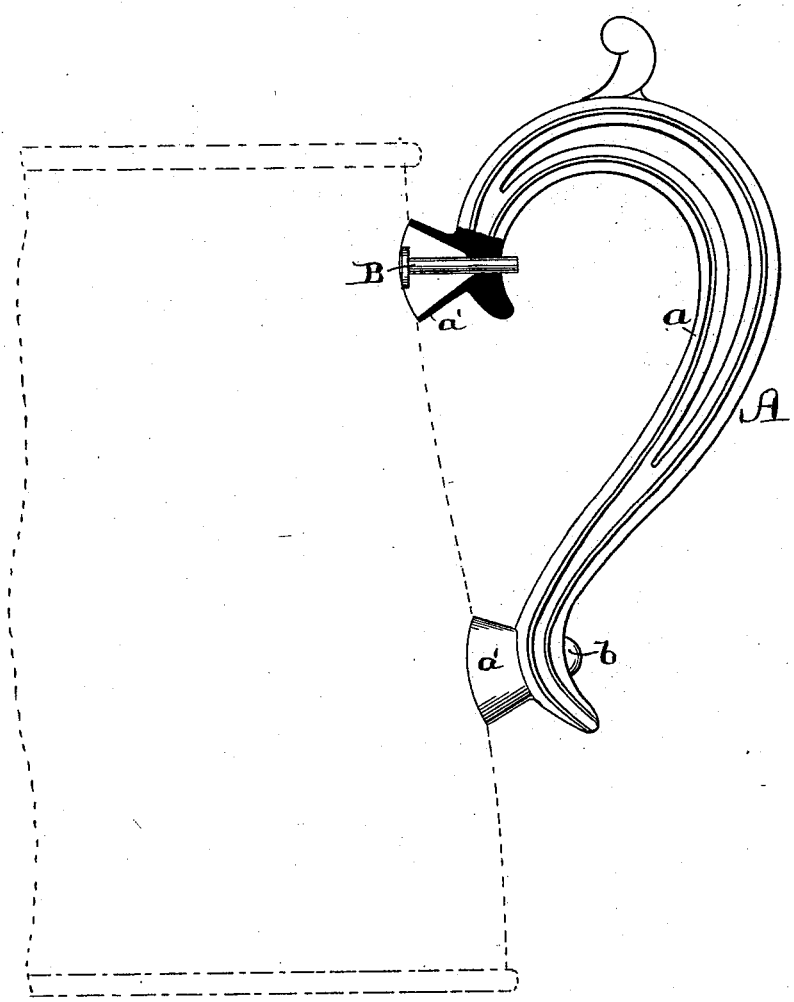
ATTEST.
Henry M. Day
Paul Bakewell
INVENTORS.
Frederick G. Niedringhaus.
William F. Niedringhaus.
by Chas. D. Moody,
att'y;

UNITED STATES PATENT OFFICE.

FREDERICK G. NIEDRINGHAUS AND WILLIAM F. NIEDRINGHAUS, OF ST. LOUIS, MISSOURI, ASSIGNORS TO ST. LOUIS STAMPING COMPANY, OF SAME PLACE.

IMPROVEMENT IN HANDLES FOR TEA AND COFFEE POTS OF ENAMELED IRONWARE.

Specification forming part of Letters Patent No. 209,132, dated October 22, 1878; application filed September 4, 1878.

*To all whom it may concern:*

Be it known that we, FREDERICK G. NIEDRINGHAUS and WILLIAM F. NIEDRINGHAUS, residents of St. Louis, Missouri, have made a new and useful Improvement in Handles for Enameled Ware Tea and Coffee Pots, of which the following is a full, clear, and exact description, reference being had to the annexed drawing, making part of this specification, where the invention is shown in elevation, partly in section.

Cast-metal handles for tea and coffee pots having sheet-metal tips to enable the handles to be attached to the body of the pot by soldering have heretofore been used. Such handles are valuable in connection with ordinary ware, but when used upon enameled ware, where it is essential that every part be thoroughly rigid to prevent injury to the enamel, the handle is objectionable in that the tips are liable to work loose upon the handle, and, in consequence, unfavorably affect the enamel.

We overcome the difficulty by casting the tips in one piece with the remainder of the handle, as in the annexed drawing, where A represents a handle having the improvement.

The body $a$ of the handle and the tips $a'$ $a'$ are formed in one piece of cast metal. The tips are perforated to receive the rivets B, which pass from the inside of the pot (shown in dotted lines) through the tips, and the handle is fastened in place by forming with solder a head, $b$, upon the rivet.

The tips form a broad bearing for the handle, and, in addition to the advantage derived from their not working loose, the present construction is much cheaper than where the tips are made separate and joined to the body of the handle by riveting or swaging; also, by making the tips part of the handle, as described, the handle throughout is of the same color, and can receive the same finish, thus making the handle more ornamental.

We claim—

The herein-described handle A, having the body $a$ and tips $a'$ $a'$, shaped as described, and formed of a single casting, for the purpose set forth.

F. G. NIEDRINGHAUS.
WM. F. NIEDRINGHAUS.

Witnesses:
B. S. HEDRICK,
JOHN GAMGEE.